Patented Dec. 23, 1930

1,785,846

UNITED STATES PATENT OFFICE

KARL THIESS, OF FRANKFORT-ON-THE-MAIN-HOCHST, GERMANY, ASSIGNOR TO GENERAL ANILINE WORKS, INC., OF NEW YORK, N. Y., A CORPORATION OF DELAWARE

AZO DYESTUFFS AND MATERIAL DYED THEREWITH

No Drawing. Application filed August 26, 1929, Serial No. 388,628, and in Germany September 18, 1928.

My present invention relates to azo dyestuffs and material dyed therewith.

I have found that new valuable azo dyestuffs, which can be produced in substance as well as on the fiber, are obtained by coupling the diazo compound of a 5-halogen-2-amino-1-benzoic acid-alkyl-ester with a naphthylamide of the 2.3-hydroxynaphthoic acid.

These dyestuffs which are characterized by the following general formula:

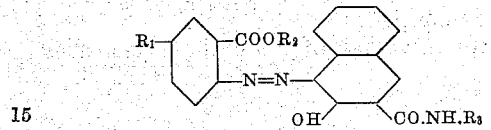

wherein
$R_1$ stands for a halogen atom,
$R_2$ for an alkyl group and
$R_3$ for a naphthyl group the hydrogen atoms of which may be substituted or not,
are distinguished by the particular purity of their tints and their good fastness properties, especially by their good fastness to light.

The following examples serve to illustrate my invention but they are not intended to limit it thereto:

Dyeing prescription for Examples 1-3

50 grams of boiled cotton are treated for half an hour in the grounding liquor, well hydro-extracted and dyed for half an hour in the dye bath. The material is then rinsed cold and hot, soaped at boiling temperature, rinsed and dried.

1. (a) Grounding liquor 2 g. of 2.3-hydroxynaphthoic acid-beta-naphthyl-amide,
4 ccm. of Turkey red oil of 50 per cent strength and
6 ccm. of caustic soda solution of 34° Bé. are dissolved in 200 ccm. of distilled water heated to boiling temperature, cooled down to 50° C., mixed with
2 ccm. of formaldehyde of 30 per cent strength and the whole is then made up with water to
1 liter.

(b) Dye bath 1.85 g. of 5-chloro-2-amino-benzoic acid-methyl ester are diazotized in the cold with
2.8 ccm. of hydrochloric acid of 22° Bé. and
0.75 g. of sodium nitrite dissolved in water. The mass is then rendered neutral to Congo paper by means of about
2 g. of sodium acetate,
25–50 g. of sodium chloride are added and the whole is made up with water to
1 liter.

A particularly vivid scarlet-red of very good fastness to light, washing and kier-boiling is obtained.

2. (a) Grounding liquor 4.5 g. of 2.3-hyroxynaphthoic acid-alpha-naphthyl-amide,
9 ccm. of Turkey red oil of 50 per cent strength and
13.5 ccm. of caustic soda solution of 34° Bé. are dissolved in 200 ccm. of distilled water heated to boiling temperature, the solution is cooled down to 50° C., mixed with
4.5 ccm. of formaldehyde of 30 per cent strength and the whole is made up with water to
1 liter.

(b) Dye bath 1.85 g. of 5-chloro-2-amino-benzoic acid-methyl ester are diazotized in the cold with
2.8 ccm. of hydrochloric acid of 22° Bé. and
0.75 g. of sodium nitrite dissolved in water. The mass is then rendered neutral to Congo paper by means of about
2 g. of sodium acetate,
25–50 g. of sodium chloride are added and the whole is made up with water to
1 liter.

A red dyeing of very good fastness properties is obtained.

3. (a) Grounding liquor 2 g. of 2.3-hydroxynaphthoic acid-beta-naphthyl-amide,
4 ccm. of Turkey red oil of 50 per cent strength and
6 ccm. of caustic soda solution of 34° Bé. are dissolved in 200 ccm. of distilled water, heated to boiling temperature, the solution is cooled down to 50° C.,
2 ccm. of formaldehyde of 30 per cent strength are added and the whole is made up with water to
1 liter.

(b) Dye bath 2.3 g. of 5-bromo-2-amino-benzoic acid-methyl ester are diazotized in the cold with
2.8 ccm. of hydrochloric acid of 22° Bé. and
0.75 g. of sodium nitrite dissolved in water. The mass is rendered neutral to Congo paper by means of about
2 g. of sodium acetate,
25–50 g. of sodium chloride are added and the whole is made up with water to
1 liter.

There is obtained a particularly vivid scarlet-red coloration of very good fastness properties, which has a somewhat more bluish shade than that prepared according to Example 1.

Example 4

20 parts by weight of 5-chloro-2-amino-benzoic acid-methyl ester are diazotized according to known methods by means of hydrochloric acid and sodium nitrite. The diazo solution, which is filtered if requisite, is coupled with a caustic alkaline aqueous solution of 31.3 parts by weight of 2.3-hydroxynaphthoic acid-beta-naphthyl-amide at a temperature of from 0° C. to 5° C. The dyestuff precipitates at once in the form of bright scarlet-red flakes. After filtration the dyestuff is washed with water and further brought into the form of a paste for instance for the preparation of lacquers.

By using other esters such for instance as the ethyl-, propyl- and butyl esters there are obtained dyestuffs and dyeings of equal properties.

I claim:

1. As new products, the compounds of the following general formula:

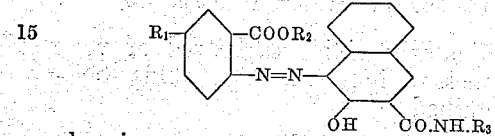

wherein
$R_1$ stands for a halogen atom,
$R_2$ for an alkyl group and
$R_3$ for a naphthyl group the hydrogen atoms of which may be substituted or not,
dyeing red tints and being distinguished by their good fastness properties, particularly by their good fastness to light.

2. As new products, the compounds of the following general formula:

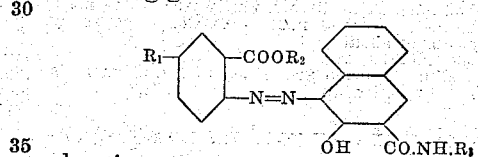

wherein
$R_1$ stands for a halogen atom,
$R_2$ for an alkyl group and
$R_3$ for an alpha- or beta-naphthyl group,
dyeing red tints and being distinguished by their good fastness properties, particularly by their good fastness to light.

3. As new products, the compounds of the following general formula:

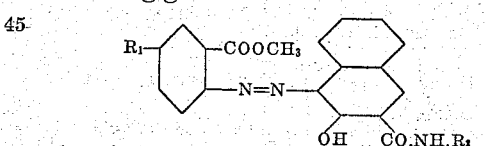

wherein
$R_1$ stands for a halogen atom and
$R_3$ for an alpha- or beta-naphthyl group,
dyeing red tints and being distinguished by their good fastness properties, particularly by their good fastness to light.

4. As new products, the compounds of the following general formula:

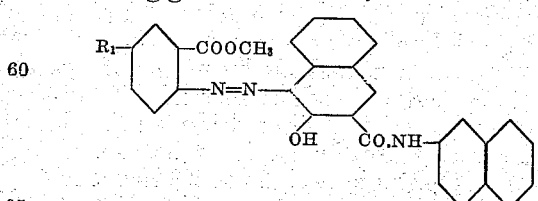

wherein
$R_1$ stands for a halogen atom,
dyeing red tints and being distinguished by their good fastness properties, particularly by their good fastness to light.

5. As a new product, the compound of the following formula:

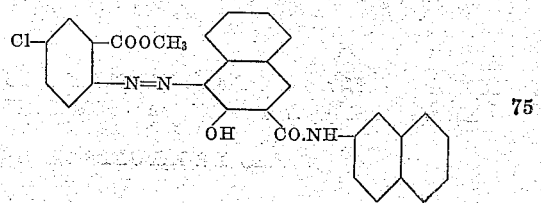

dyeing red tints and being distinguished by its good fastness properties, particularly by its good fastness to light.

6. Material dyed with the dyestuffs claimed in claim 1.

7. Material dyed with the dyestuffs claimed in claim 2.

8. Material dyed with the dyestuffs claimed in claim 3.

9. Material dyed with the dyestuffs claimed in claim 4.

10. Material dyed with the dyestuff claimed in claim 5.

In testimony whereof, I affix my signature.

KARL THIESS.